United States Patent [19]
Lee

[11] Patent Number: 5,655,784
[45] Date of Patent: Aug. 12, 1997

[54] HIGH PERFORMANCE IN-LINE ROLLER SKATE WHEELS

[76] Inventor: Charles J. Lee, 11404 Prescott Ln., Westchester, Ill. 60154

[21] Appl. No.: 411,327

[22] Filed: Mar. 27, 1995

[51] Int. Cl.⁶ .......................... A63C 17/14; A63C 17/02; A63C 17/22
[52] U.S. Cl. .......................... 280/11.22; 301/5.7; 301/5.3
[58] Field of Search .................. 280/11.2, 11.22, 280/11.9; 301/5.3, 5.7

[56] References Cited

U.S. PATENT DOCUMENTS

| | | | |
|---|---|---|---|
| D. 341,863 | 11/1993 | Cavasin | D21/226 |
| D. 342,113 | 12/1993 | Cavasin | D21/226 |
| D. 343,669 | 1/1994 | Pratt | D21/226 |
| D. 345,405 | 3/1994 | Cavasin | D21/226 |
| D. 346,192 | 4/1994 | Miller et al. | D21/226 |
| D. 346,633 | 5/1994 | Conte | D21/226 |
| D. 347,672 | 6/1994 | Arney et al. | D21/226 |
| 4,909,523 | 3/1990 | Olson | 280/11.2 |
| 5,048,848 | 9/1991 | Olson et al. | 180/11.22 |
| 5,068,956 | 12/1991 | Malewicz | 29/437 |
| 5,183,276 | 2/1993 | Pratt | 280/11.22 |
| 5,190,301 | 3/1993 | Malewicz | 280/11.22 |
| 5,207,454 | 5/1993 | Blankenburg et al. | 280/843 |
| 5,271,633 | 12/1993 | Hill, Jr. | 280/11.22 |
| 5,286,043 | 2/1994 | Tkaczyk | 280/11.22 |
| 5,303,940 | 4/1994 | Brandner | 280/11.22 |
| 5,308,152 | 5/1994 | Ho | 301/5.3 |
| 5,310,250 | 5/1994 | Gonsior | 301/5.3 |
| 5,312,844 | 5/1994 | Gonsior | 521/99 |
| 5,356,209 | 10/1994 | Hill | 301/5.7 |
| 5,503,466 | 4/1996 | Lew | 301/5.3 |

Primary Examiner—Brian L. Johnson
Assistant Examiner—Jonathan E. Butts
Attorney, Agent, or Firm—Thomas W. Tolpin

[57] ABSTRACT

A set of high speed, light weight wheels are provided for in-line roller skates. The high performance wheels each have a single large, light weight bearing, a special hub with a light weight fiber-reinforced core, and a high strength tire.

7 Claims, 5 Drawing Sheets

HIGH PERFORMANCE IN-LINE ROLLER SKATE WHEELS

BACKGROUND OF THE INVENTION

This invention pertains to roller skates and, more particularly, to in-line roller skate wheels.

Before the popularity of in-line roller skating, roller skaters typically used quad-type roller skates with a pair of wheels or rollers at the front near the toe and a pair of wheels at the back near the heel. Quad-type pairs of wheels or rollers were usually mounted on trucks or casters upon frames which were attached to shoes or boots. The wheels were often made of metal. The popularity of quad-type roller skates has been surpassed by in-line roller skates.

In-line or linear roller skates utilize two or more wheels positioned to rotate within a common plane along a straight line. To many skaters, in-line roller skates have a feel and behavior often associated with ice skates, i.e. similar body movements are utilized to operate both ice skates and in-line roller skates. In-line roller skates have become increasingly popular with ice skaters as a training tool for off season and for use on sidewalks, driveways and streets. In-line roller skating today has a become a popular recreational activity for sports enthusiasts of all ages.

Conventional in-line roller skates typically have two roller bearing, i.e. left and right roller bearings, mounted on an 8 mm axle. Conventional in-line bearings have a diameter of 22 mm and are relatively heavy, weighing about 12–15 grams each with each bearing having a width 7 mm. Conventional in-line bearings have a combined bearing weight of 24–30 grams and a combined bearing width of 14 mm. Conventional in-line roller skates also have large hubs and rims and 12 spokes. Conventional hubs and rims generally each have a width of 24–25 mm. Conventional hubs have heavy cores weighing 30–40 grams with the entire wheel weighing 72–100 grams. Conventional rims are small with a diameter of 38–40 mm. The ratio of conventional rim width to conventional bearing width is 1.71–1.78. Conventional in-line roller skate also have low to moderate strength, soft tires with a tensile strength of 8,000–10,000 psi and a hardness of 76–85 durometers on the A Scale. Conventional in-line skate tires have diameters ranging from 47–82 mm.

It is desirable to provide an improved in-line roller skate for greater speed, maneuverability and control.

SUMMARY OF THE INVENTION

Improved high performance in-line roller skates are provided for greater speed, maneuverability and control. The faster in-line roller skates are impressive to use, durable and attractive. Advantageously, the high performance in-line roller skates are efficient, effective, and economical. Desirably, the high performance in-line roller skates can be readily produced and have superb marketing and advertising appeal.

To this end, the improved quality in-line roller skates each haves a set of high speed, light weight tandem wheels that are positioned generally in alignment with each other. Significantly, each of the wheels has a single, large, light weight bearing that weighs substantially less than 30 grams. The large impact-resistant bearing has an outside diameter that is greater that 22 mm, can be used at high dynamic temperatures for extended periods of time, preferably has a relatively long wear life. The bearing has half the friction of conventional dual being setups and avoids off axis misalignment which can occur with conventional dual bearing setups.

Each wheel also has a light weight fiber-reinforced core to reduce core flex and attain greater skating speed. The core preferably includes: a high performance hub, an inner rim, a first set of elongated inner spokes which connect the hub to the inner rim, an outer rim, and a second set of short outer mini-spokes which connect the inner and outer rims. The hub securely receives the bearing and weighs substantially less than 72 grams, preferably 10–50 grams. To further enhance performance, a high strength tire is mounted on the bearing. The high strength tire has a width greater than the maximum width of the bearing and has a tensile strength substantially greater than 10,000 psi. Advantageously, the outer spokes and outer rim cooperate with each other to provide a mechanical trap to securely connect the core to the tire. The mechanical trap can be solid or hollow.

In the preferred form, the hub can have a rim with a diameter greater than 40 mm and the rim has a width substantially less than the maximum width or thickness of the tire. For best results, the hub has a narrow width that is substantially less than 25 mm. The outer side of the hub can have a raised shoulder which seats against and prevents outward movement of the bearing. If desired, the inner side of the hub can also have a raised shoulder. The tire can have threads and has a hardness substantially greater than 85 durometers on the A scale to increase longevity and wear. Each tire can also have a wear indicator. Preferably each wheel also has at least one retainer or retaining ring which fits into one or more grooves in the core to secure the bearing. Pronation adjustable wheels can also be used for various types of skating. Each wheel can further have 8–12 inner spokes and 8–12 outer mini-spokes. In the illustrative embodiment, the spokes and mini-spokes are solid. For lighter weight wheels, the spokes, mini-spokes, and/or rims can be hollow.

A more detailed explanation of the invention is provided in the following description and claims taken in conjunction with the accompanying drawings.

DETAILED DESCRIPTION OF THE PREFERRED EMBODIMENT

Figure 1:
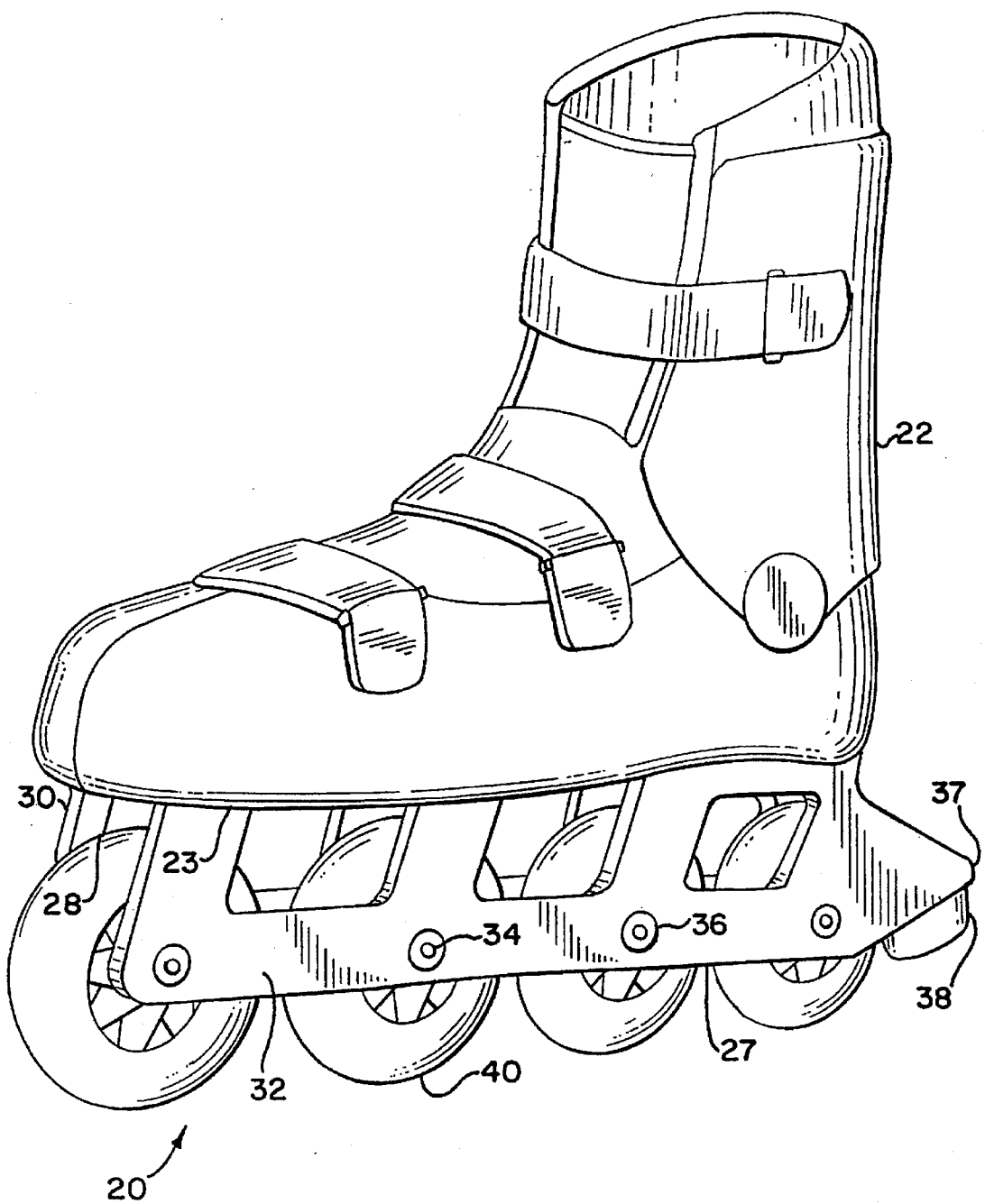
FIG. 1 is a perspective view of an in-line roller skate in accordance with principles of the present invention.
Figure 2:
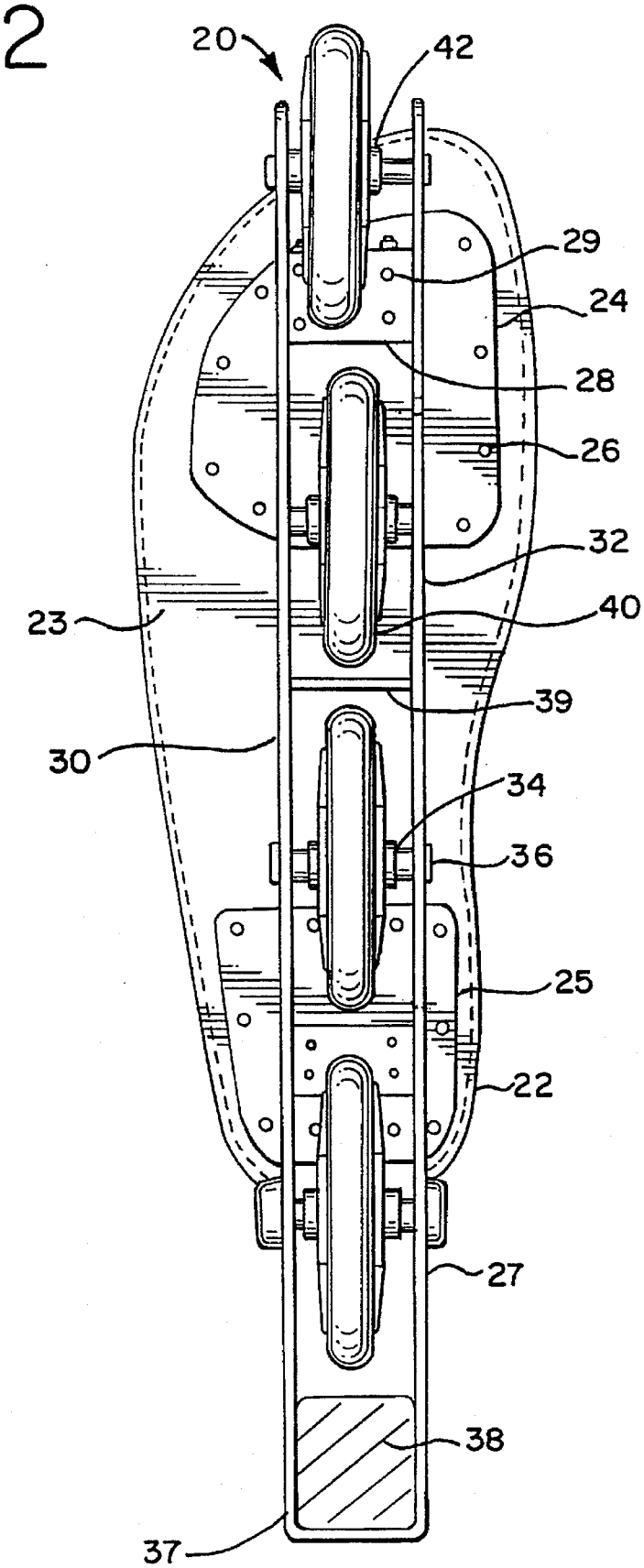
FIG. 2 is a bottom view of the in-line roller skate with one of the wheels adjusted to an offset position.

FIGS. 1 and 2 of the drawings illustrate a high performance in-line roller skate 20. The roller skate has a boot 22 with a sole 23. The boot can have laces or straps. The sole can have toe and heel support plates 24 and 25 (FIG. 2) which can be fastened to the sole by rivets 26 or screws or otherwise secured thereto. The boot provides protection and support to the foot and ankle of the skater. A wheel-supporting bracket skate frame providing a chassis 27 is mounted or otherwise attached to the sole of the boot. The chassis can be channel-shaped with upper horizontal intermediate sole-connecting plate sections 28 which can be fastened by rivets 29 or bolts or otherwise secured to the sole or toe and heel support plates of the sole. The chassis can have a pair of vertical sides 30 and 32 which can comprise flanges or rails that extend downwardly from the plate sections. The frame can be made of metal or plastic, e.g. fiberglass reinforced nylon.

An array of aliquotly 2–6 spaced axles 34 or shafts are mounted transversely across the sides of the chassis. The axles can comprise rivets or bolts secured by locknuts 36. The axles rotatably support a series, set or array of 2–6 high performance, light weight, narrow wheels 40. Each of the axles has a shaft diameter of at least 9 mm for greater bending and shear strength.

The chassis can also be connected to a separate or integral U-shaped rear frame section 37 with a brake assembly or rear brake 38 fastened thereto. One or more transverse reinforcing ribs 39 can extend between and connect the sides of the chassis between the wheels.

The high performance, light weight in-line skate wheels 40 are longitudinally aligned in registration with each other in a single row in a straight line in the direction of movement of the skater. Adjustable fasteners 42 can be attached to the axle to accommodate pronation adjustable wheels, i.e. for lateral adjustment and offset of the wheels. The wheels can also be adjusted for angular mounting on the axles to enable the skater to attain improved traction during turns. Each of the light weight thinner wheels 40 weighs substantially less than 72–100 grams and preferably weighs 25–40 grams to substantially minimize axial torque, torsion and skewing.

In order to reduce internal bearing surface friction, each wheel has only one bearing comprising a single, large, light weight bearing 50 (FIG. 3) which is symmetrically located in the middle of the wheel. The bearing has an inner bearing surface 52 secured to one of the axles and has an outer bearing surface 54 with an outside diameter ranging from 24–26 mm. In the preferred embodiment, the light weight bearing weighs 4–12 grams and the maximum width of the bearing width is 2–7 mm.

Each wheel also includes a small, light weight, fiber-reinforced core 60 to reduce core flex and attain greater skating speed. The core can be molded in one or more parts from nylon reinforced with Kevlar polyaramid fiber. In some circumstances, it may be desirable that the core be molded of reinforced polyurethane or other moldable polymers, or reinforced carbon fibers or other types of fibers or that the bearing be integrally molded to the core. The core includes a high performance hub 61. The hub comprises an annular central portion of the core and has an inner hub surface 62 and an outer hub surface 63.

The inner (inside) surface 62 of the hub provides a bearing seat which is press fit or secured by a friction fit to the bearing. The inside surface of the hub also has a circular annular groove 64 which receives a retaining ring 66 (FIG. 3), snap ring or retainer which annularly engages and secures the outer bearing surface of the bearing to the hub. If desired, more than one ring and groove can be used. Shims can also be used. The outer side of the hub can also have at least one raised shoulder 68 (FIG. 5) which seats against and prevents outward lateral movement of the bearing. The shoulder can comprise a ribbed or solid shoulder.

Figure 3:
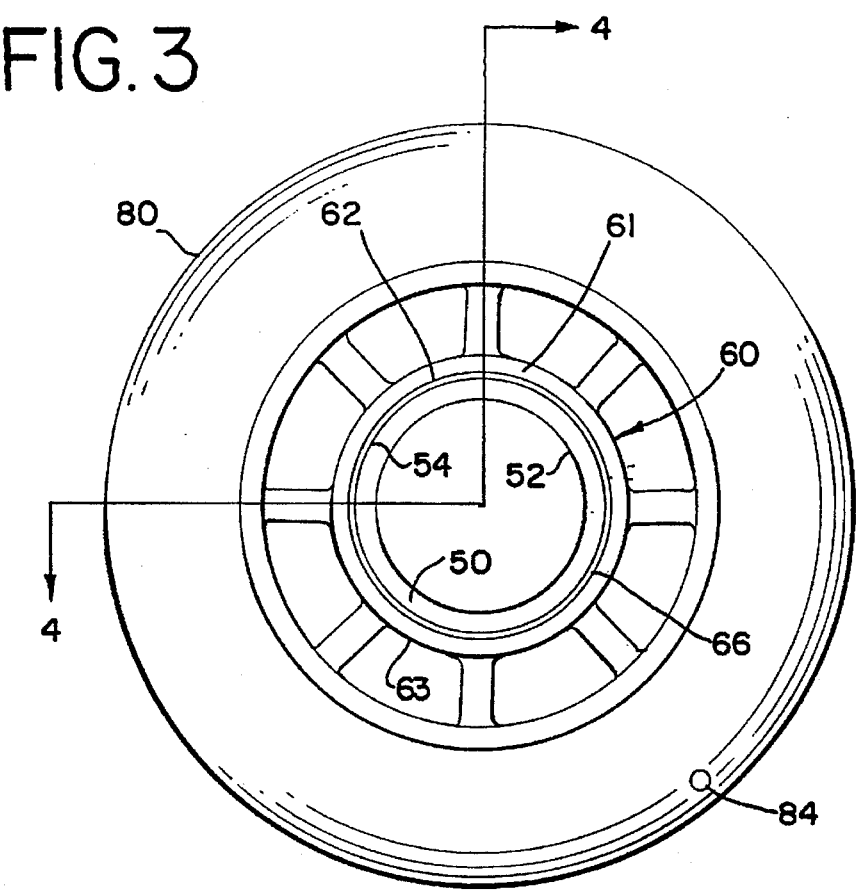
FIG. 3 is a front view of an in-line roller skate wheel.
Figure 4:
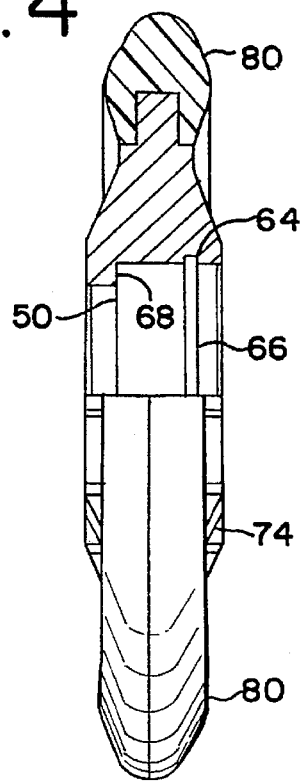
FIG. 4 is a cross-sectional view of the in-line roller skate wheel taken substantially along line 4—4 of FIG. 3.
Figure 5:
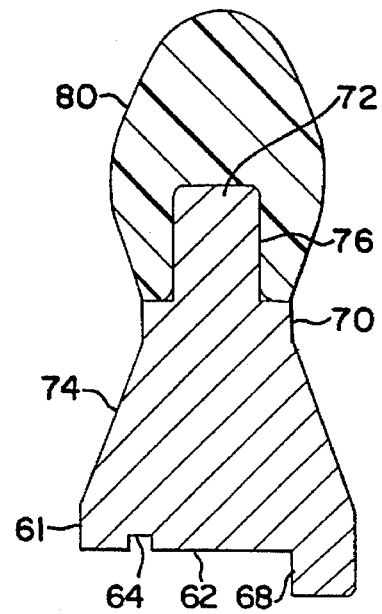
FIG. 5 is an enlarged cross-sectional view of part of a solid core and tire.
Figure 7:
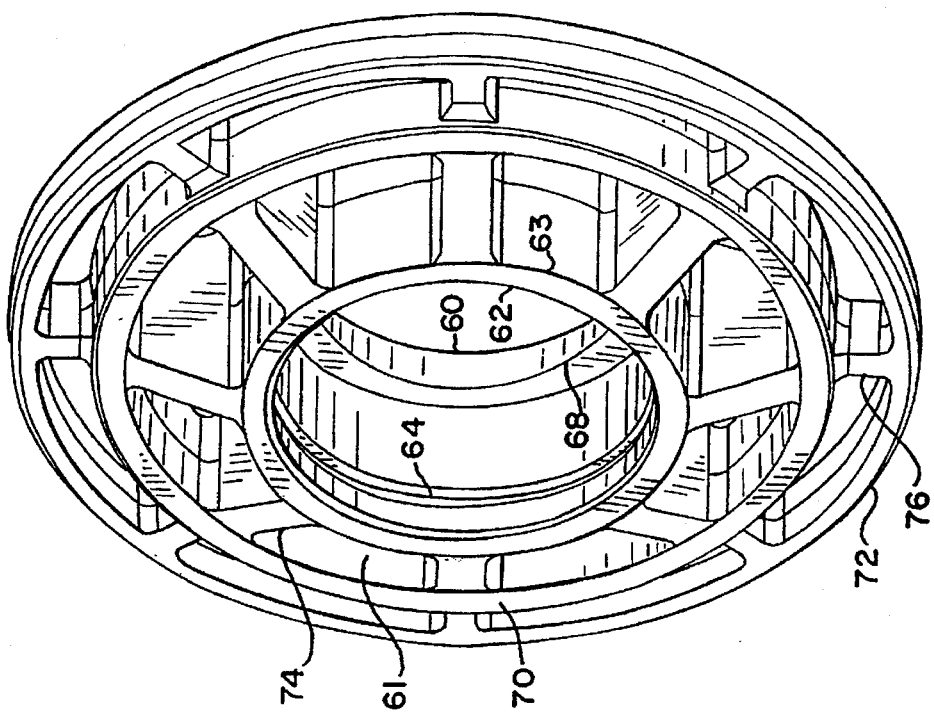
FIG. 7 is a perspective view of the core as viewed from the groove (front) side.
Figure 8:
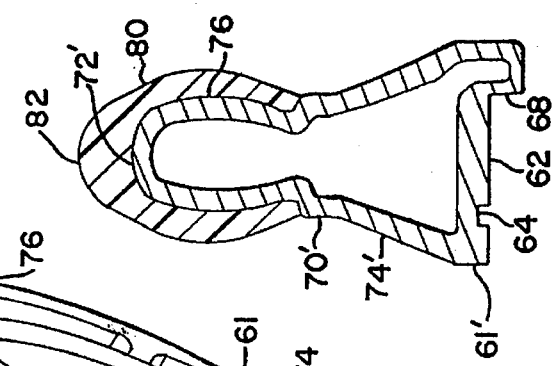
FIG. 8 is an enlarged cross-sectional view of part of a hollow core and tire.
Figure 6:
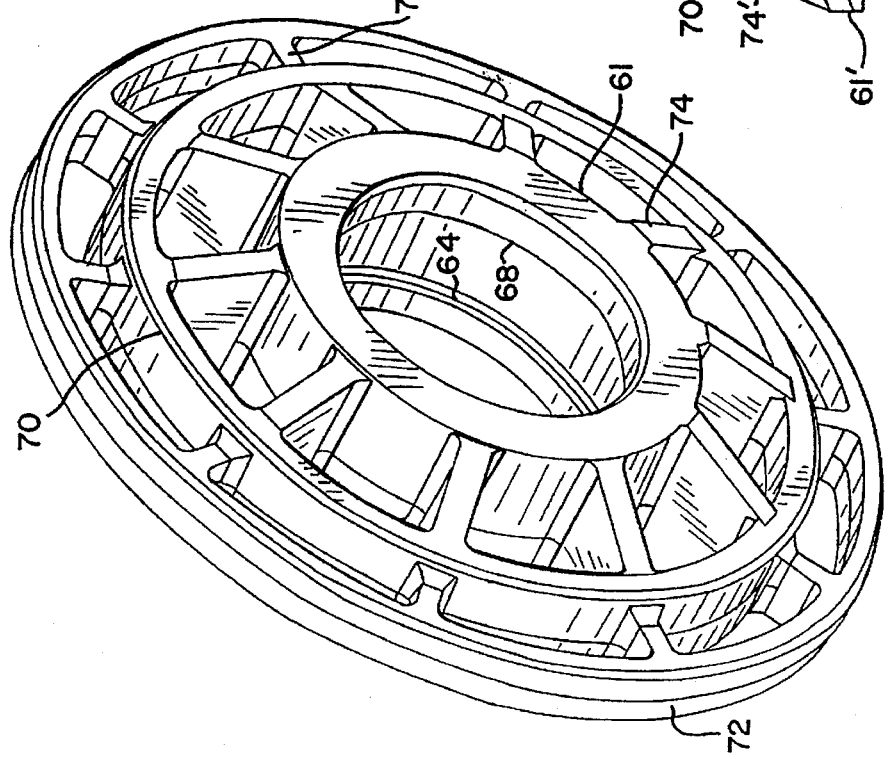
FIG. 6 is a perspective view of the core as viewed from the shoulder (back) side.

As shown in FIGS. 6 and 7, the core 60 has: a high performance hub 61; an inner flanged rim 70 that is positioned about the hub; an outer rim 72 that is positioned about the inner rim; a first set of 8–12 elongated inner spokes 74, arms or ribs, which extend radially between and connect the hub to the inner rib; and a second set of 8–12 outer spokes 76 (mini-spokes), arms or ribs, which extend radially between and connect the inner and outer rims. The outer spokes and outer rim cooperate with each other to provide a mechanical trap to innerlockingly engage and secure a tire 80 (FIGS. 3–5). In the preferred embodiment, the inner and outer spokes are solid and radially aligned with each other as shown in FIGS. 4–7. The spokes reduce the overall weight of the wheel. As shown in FIG. 8, for further reduced weight and more speed, the hub 61', spokes 74' and 76', inner rim 70', outer rim 72', and/or mechanical trap can be hollow.

The width of the inner rim is at least as small as the maximum bearing width. The ratio of the inner rim width to the bearing width is less than or equal to one, i.e. $\leq 1$. In the preferred embodiment, the width of the inner rim is 2–7 mm and the lateral width of the hub (core) is 4–13 mm. The ratio of the hub width to the inner rim width is $\geq 1$, and preferably 1.81.

For greater stability and ride quality and to better enable the tire to hold the surface of the pavement, as well as to minimize undersirable tilting, skewing, and tread squirm, the ratio of the vertical spacing between the outside diameter (outer thread surface) of the tire and the outer rim to the lateral spacing between the lateral outer side of the tire and the outer rim ranges from 0.3 to 0.8.

Figure 10:
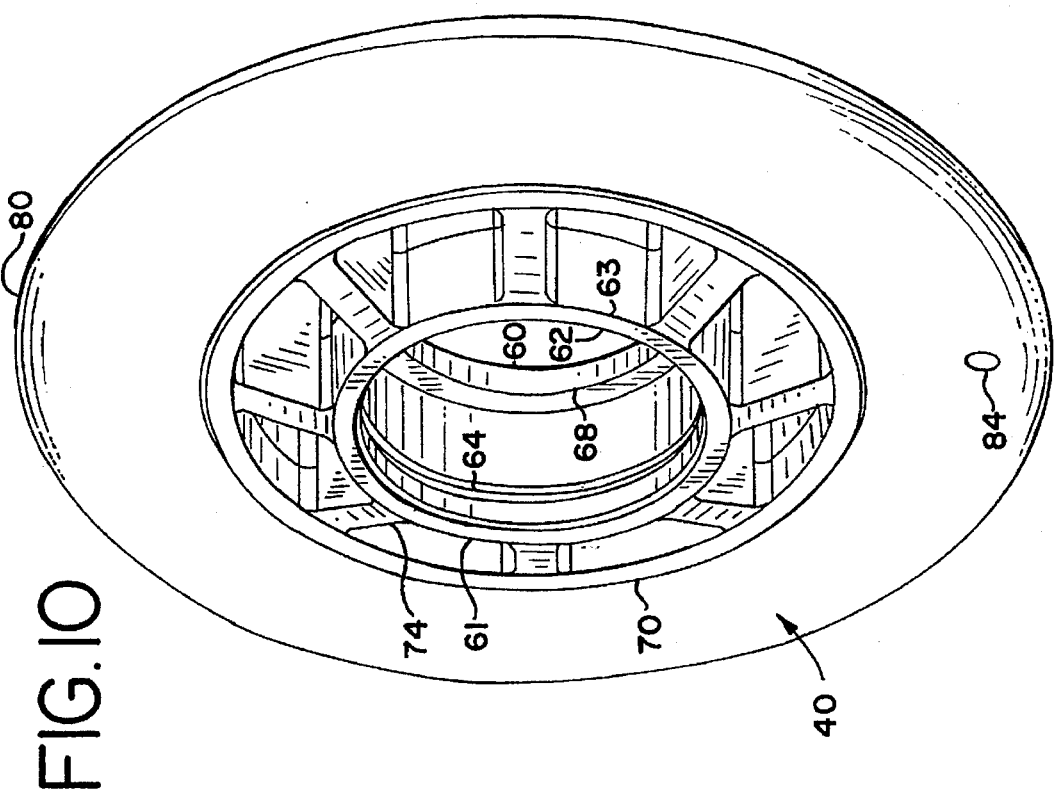
FIG. 10 is a perspective view of the in-line skate wheel as viewed from the groove (front) side.
Figure 9:
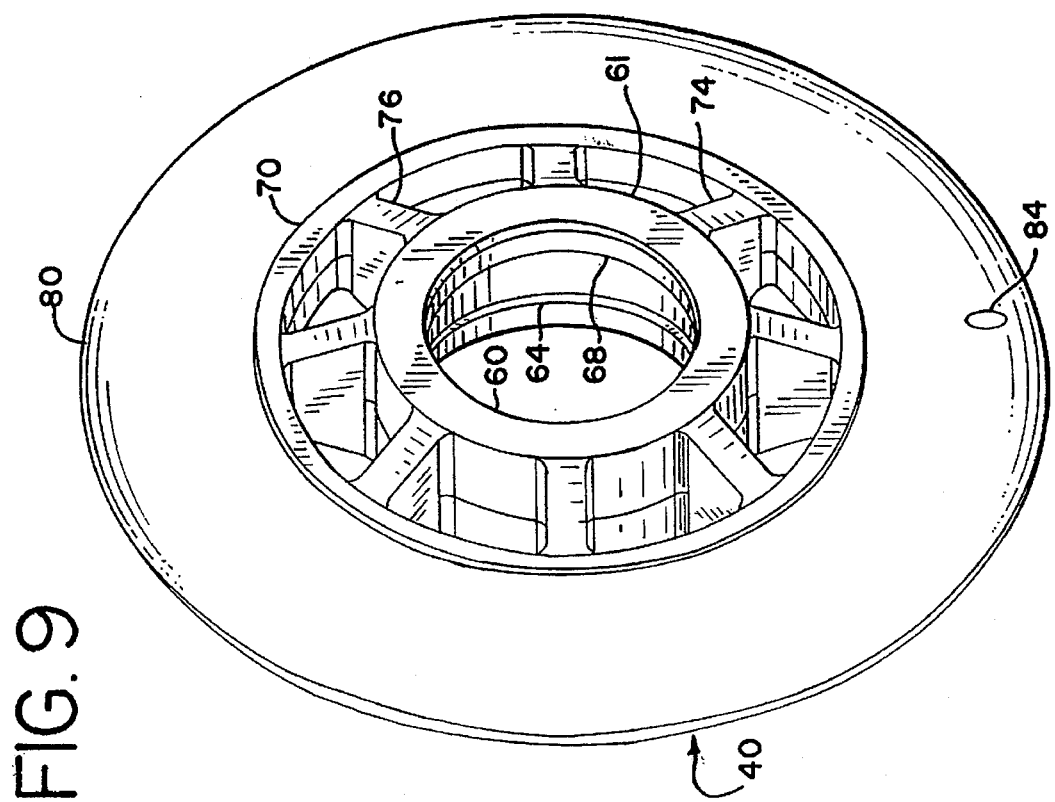
FIG. 9 is a perspective view of the in-line skate wheel as viewed from the shoulder (back) side.

The tire 80 (FIGS. 3, 9 and 10) annularly surrounds and is secured to the hub about the rims. In the preferred embodiment, the tire preferably comprises a high strength solid non-pneumatic tire with a tensile strength ranging form 26,000–40,000 psi and a hardness ranging from 60– 85 durometers on the D Scale. The thickness (width) of the tire is at least as great as the maximum width of the bearing. Preferably, the maximum tire thickness is greater than the maximum transverse span or width of the inner rim, as well as the outer rim, i.e. $\geq 1$. Most preferably, the ratio of the inner rim width to the thickness (width) of the tire ranges from 0.6 to 0.9. Preferably, the hub width is not the same as the inner rim width. Most preferably, the ratio of the hub width to the inner rim width is >1. For best results, the upper portion of the tire adjacent the outer rim and mechanical trap is convex and flared. The profile of the tire can be greater than 180 degrees and preferably ranges from 210–340 degrees, most preferably 300–330 degrees. The tire can also have threads 82 (FIG. 8) on its outer surface. The tire can be made of thermosetting or thermoplastic polyurethane. In some circumstances, it may be desirable to mold the tire out of other elastomeric materials or that the tire be semi-solid, hollow or pneumatic with air pockets or voids.

In order to monitor tire wear, each tire can have at least one wear marker 84 (FIGS. 3, 9 and 10) bonded or otherwise secured thereto. The wear marker provides a wear indicator to indicate and view the wear of the tire. Worn tires should be replaced for peak performance. The wear marker can be in the shape of a bubble or tear drop or can be an indented circle.

Among the many advantages of the in-line roller skate are: (1) Superb performance; (2) Excellent speed and maneuverability; (3) Outstanding marketing, advertising, and promotional appeal; (4) Superior quality; (5) Impressive; (6) Cost effective; (7) Simple to assemble; (8) Easy to use; (9) Economical; (10) Attractive; (11) Efficient; (12) Effective; (13) decreased dynamic and static moment of inertia along the longitudinal, horizontal and vertical axes, i.e. roll, yaw, and pitch; (14) quicker camber changes; (15) more like ice-skate blades; (16) reduced mass; and (17) decreased bearing and tire friction.

Although embodiments of the invention have been shown and described, it is to be understood that various modifications and substitutions, as well as rearrangements of parts, components, and process steps, can be made by those skilled in the art without departing from the novel spirit and scope of this invention.

What is claimed is:

1. An in-line roller skate, comprising:

a boot having a sole;

a wheel-supporting bracket skate frame providing a chassis attached to said sole;

a series of light weight wheels positioned substantially in longitudinal alignment in the direction of movement of the skater;

an array of aliquotly spaced axles providing shafts mounted transversely in said frame for rotatably supporting said wheels, each of said axles having a shaft diameter of at least 9 mm for greater bending and shear strength;

each of said light weight wheels weighing substantially less than 72 grams for substantially minimizing axial torque and skewing, said wheels each comprising only one bearing for substantially reducing internal bearing surface friction, said bearing having an inner bearing surface secured to one of said axles and having an outer bearing surface with a maximum bearing width, said outer bearing surface having an outside diameter ranging from about 24 mm to about 26 mm;

fiber-reinforced core for reducing core flex and attaining greater skating speed, said core having an annular central portion providing a hub in press-fitting engagement with said bearing, said hub having an outer hub surface providing a rim and an inner hub surface providing an inner side defining an annular groove, said rim having a rim width at least as small as the maximum bearing width;

at least one retaining ring positioned in the annular groove of said hub for annularly engaging and securing the outer bearing surface of said bearing to said hub;

an inner rim positioned about said hub;

a first set of spokes comprising 8–12 elongated inner spokes extending radially between and connecting said outer hub surface to said inner rim;

an outer rim positioned about said inner rim;

a second set of spokes comprising 8–12 outer mini-spokes extending radially between and connecting said inner and outer rims;

a non-pneumatic tire annularly surrounding said hub, said tire having an outside surface and thickness at least as great as the maximum bearing width, said tire thickness being greater than said rim width, said tire having a tensile strength ranging from about 26,000 psi to about 40,000 psi and a hardness ranging from about 60 durometers to about 85 durometers on the D Scale, and said tire having a flared upper potion; and said mini-spokes and outer rim cooperating with each other to provide a mechanical trap extending from said inner rim for interlocking engagement with said tire to securely attach said tire to said inner and outer rims.

2. An in-line roller skate in accordance with claim 1 wherein said hub has an outer shoulder for seating against and substantially preventing outward movement of said bearing.

3. An in-line roller skate in accordance with claim 1 wherein:

said wheel weighs about 20–40 grams;

said bearing weighs from about 4–12 grams;

said bearing has a width of from about 2–7 mm;

said core weighs about 10–50 grams;

said hub has a lateral width from about 4–13 mm;

said inner rim comprises a flanked rim and has a width from about 2–7 mm;

the ratio of said inner rim width to the thickness of said tire ranges from about 0.6 to about 0.9;

said hub is wider than said inner rim; and said chassis has a rear frame section with a brake assembly.

4. An in-line roller skate in accordance with claim 1 wherein said wheel includes a wear marker on said tire for indicating tire wear.

5. An in-line roller skate in accordance with claim 1 wherein the ratio of the vertical spacing between the outer surface of the tire and the outer rim to the lateral spacing between the outer side of the tire and said outer rim is ranges from about 0.3 to about 0.8 for greater stability and ride quality and to better enable the tire to hold the surface of the pavement.

6. An in-line roller skate in accordance with claim 1 wherein said mechanical trap comprises a substantially solid mechanical trap.

7. An in-line roller skate in accordance with claim 1 wherein said mechanical trap comprises a substantially hollow mechanical trap.

* * * * *